(12) United States Patent
Akiba (10) Patent No.: US 8,448,005 B2
(45) Date of Patent: May 21, 2013

(54) INFORMATION PROCESSING APPARATUS, INFORMATION PROCESSING SYSTEM, AND INFORMATION PROCESSING METHOD

(75) Inventor: Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 12/388,442

(22) Filed: Feb. 18, 2009

(65) Prior Publication Data

US 2009/0210733 A1    Aug. 20, 2009

(30) Foreign Application Priority Data

Feb. 19, 2008   (JP) .................................. 2008-037849

(51) Int. Cl.
*G06F 1/32*     (2006.01)
*G06F 1/00*     (2006.01)

(52) U.S. Cl.
USPC .......................................... 713/323; 713/320

(58) Field of Classification Search .................. 713/323, 713/320
See application file for complete search history.

(56) References Cited

U.S. PATENT DOCUMENTS

| | | | | |
|---|---|---|---|---|
| 5,742,833 A * | 4/1998 | Dea et al. | ....................... | 713/323 |
| 5,900,026 A * | 5/1999 | Ryu | ............................... | 713/320 |
| 7,107,442 B2 * | 9/2006 | Cheshire | ........................... | 713/1 |
| 7,372,588 B1 * | 5/2008 | Jeong | ........................... | 358/1.15 |
| 7,843,953 B2 * | 11/2010 | Kawata et al. | ................. | 370/419 |
| 7,904,739 B2 * | 3/2011 | Larson | ........................... | 713/323 |
| 8,049,919 B2 * | 11/2011 | Yoshida | ........................ | 358/1.15 |
| 8,095,814 B2 * | 1/2012 | O'Connell et al. | ........... | 713/323 |
| 2002/0144023 A1 | 10/2002 | Kawabuchi | | |
| 2004/0153676 A1 * | 8/2004 | Krantz et al. | .................. | 713/300 |
| 2005/0170868 A1 * | 8/2005 | Fischer | ......................... | 455/574 |
| 2006/0191435 A1 | 8/2006 | Fujihara | | |
| 2006/0265473 A1 * | 11/2006 | Muto | ........................... | 709/218 |
| 2006/0274665 A1 * | 12/2006 | Hatori et al. | ................... | 370/252 |
| 2007/0124440 A1 | 5/2007 | Maki | | |
| 2008/0104243 A1 * | 5/2008 | Roscoe et al. | ................ | 709/226 |
| 2009/0119766 A1 * | 5/2009 | Huetter et al. | .................. | 726/12 |
| 2009/0292812 A1 * | 11/2009 | Ishida et al. | ................... | 709/226 |
| 2010/0083015 A1 * | 4/2010 | Yokota et al. | .................. | 713/310 |

FOREIGN PATENT DOCUMENTS

| | | |
|---|---|---|
| JP | 2006-293818 A | 10/2006 |
| JP | 2007-174106 A | 7/2007 |
| JP | 2007-301841 | 11/2007 |

* cited by examiner

*Primary Examiner* — Paul R Myers
*Assistant Examiner* — Christopher a Daley
(74) *Attorney, Agent, or Firm* — Canon U.S.A., Inc., IP Division (57) ABSTRACT

An information processing apparatus includes a transfer unit configured to retain at least one network address from among a plurality of network addresses and transfer other network addresses to other information processing apparatus, a power saving state shifting unit configured to shift to a power saving state, and a return unit configured to return the power saving state to a normal state when the retained network address is accessed.

9 Claims, 5 Drawing Sheets

| ID | ADDRESS | TRANSFER FLAG | IN-USE FLAG | RETURN FLAG | RETURN ADDRESS |
|---|---|---|---|---|---|
| 1 | fd00::1:1 | 0 | 1 | 0 | |
| 5 | fd00::1:2 | 1 | 1 | 0 | |
| 6 | fd00::1:3 | 1 | 1 | 0 | |
| 9 | fd00::1:4 | 1 | 1 | 1 | |

FIG. 5B

| ID | ADDRESS | TRANSFER FLAG | IN-USE FLAG | RETURN FLAG | RETURN ADDRESS |
|---|---|---|---|---|---|
| 1 | fd00::2:1 | 0 | 1 | 0 | |
| 2 | fd00::2:2 | 1 | 1 | 0 | |
| 3 | fd00::2:3 | 1 | 1 | 0 | |
| 4 | fd00::2:4 | 1 | 1 | 1 | |

FIG. 6A

| ID | ADDRESS | TRANSFER FLAG | IN-USE FLAG | RETURN FLAG | RETURN ADDRESS |
|---|---|---|---|---|---|
| 1 | fd00::1:1 | 0 | 1 | 0 | |
| 5 | fd00::1:2 | 1 | 1 | 0 | |
| 6 | fd00::1:3 | 1 | 1 | 0 | |
| 9 | fd00::1:4 | 1 | 1 | 1 | |

FIG. 6B

| ID | ADDRESS | TRANSFER FLAG | IN-USE FLAG | RETURN FLAG | RETURN ADDRESS |
|---|---|---|---|---|---|
| 1 | fd00::2:1 | 0 | 1 | 0 | |
| 2 | fd00::2:2 | 1 | 1 | 0 | |
| 3 | fd00::2:3 | 1 | 1 | 0 | |
| 4 | fd00::2:4 | 1 | 1 | 1 | |
| 5 | fd00::1:2 | 0 | 1 | 0 | |
| 6 | fd00::1:3 | 0 | 1 | 0 | |
| 9 | fd00::1:4 | 0 | 1 | 1 | fd00::1:1 |

INFORMATION PROCESSING APPARATUS, INFORMATION PROCESSING SYSTEM, AND INFORMATION PROCESSING METHOD

BACKGROUND OF THE INVENTION

1. Field of the Invention

The present invention relates to an information processing apparatus, an information processing system, and an information processing method.

2. Description of the Related Art

In recent years, network technology has shown remarkable progress. Currently, many pieces of office equipment including fax machines, printers, copiers, and image scanners are connectable via a network. The protocol which is most commonly used for network communication between these apparatuses is the Internet Protocol (IP). At present, internet protocol version 4 (IPv4) is the most prevailing protocol, however, adoption of internet protocol version 6 (IPv6) is gradually growing due to an IP address shortage problem and because of security concerns.

Since IPv6 has a much larger address space than IPv4, a plurality of addresses can be allocated for one apparatus as needed for each service provided by the apparatus. In IPv4, one address is provided for one apparatus.

In recent years, rules about power consumption of electric appliances have become strict due to increased international attention to environmental issues. Nowadays, it is essential that electric appliances on the market have a power saving function. The power saving function suspends some of the functions or reduces the operation speed of the appliance when a user does not use the appliance to reduce power consumption, and returns the appliance to normal operation when the user operates the appliance again, or an external request is made.

The external request includes operation by the user and automatic timed operation (see Japanese Patent Application Laid-Open No. 2007-301841). Further, if an apparatus is connected to a network, a personal computer (PC) and another apparatus can check a state of the apparatus and send an operation request via the network.

Examples of the states that can be checked are as follows:
Presence confirmation in a network layer of the open systems interconnection (OSI) model by internet control message protocol (ICMP) which is sent and received using a ping command.
Inquiry about network service using service location protocol (SLP).
Inquiry about device setting by web services on devices (WSD)
Inquiry about database of apparatus information (management information base (MIB)) of a network apparatus using simple network management protocol (SNMP).

In order to return from a power saving state to a normal state when the apparatus receives such an inquiry of the state checking and the operation request, a reset signal can be issued to the apparatus when the apparatus receives specified network data (packet) which is registered in a network controller.

However, in a case where the apparatus, for example, a network printer, is regularly checked for its state by a PC, the apparatus returns from the power saving state to a normal operating state each time it is checked, and then returns to the power saving state again. This operation will be repeated.

In other words, even if an apparatus has a power saving function, if the apparatus is regularly accessed via a network, low power consumption cannot be realized.

Further, since only a small number of packet patterns can be set on a local area network controller (LANC), it will be difficult to respond to all inquiries and reduce power consumption at the same time if types of inquiry about the apparatus state increase.

SUMMARY OF THE INVENTION

The present invention is directed to an information processing apparatus capable of responding to an inquiry such as state checking while maintaining a power saving state.

According to an aspect of the present invention, an information processing apparatus includes a transfer unit configured to retain at least one network address from among a plurality of network addresses and transfer other network addresses to other information processing apparatus, a power saving state shifting-unit configured to shift to a power saving state, and a return unit configured to return the power saving state to a normal state when the retained network address is accessed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
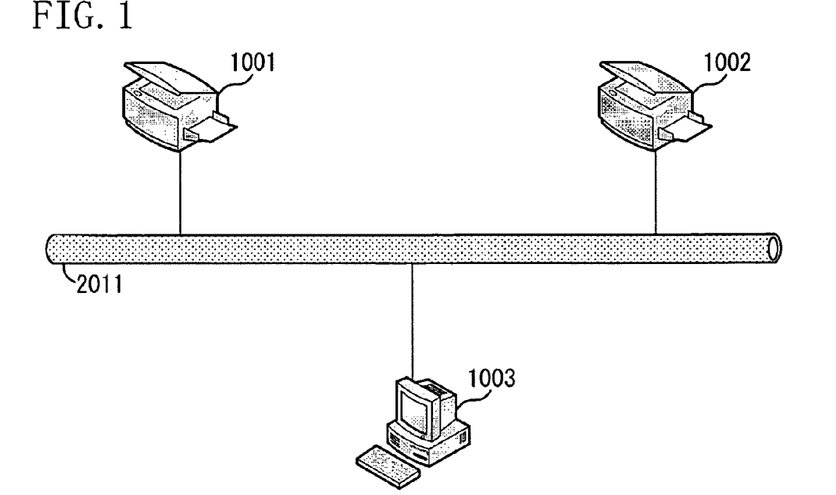
FIG. 1 illustrates a system configuration of an information processing system according to an exemplary embodiment of the present invention.

FIG. 1 illustrates an example of a system configuration of an information processing system according to an exemplary embodiment of the present invention.

In FIG. 1, a printer 1001, as an example of a first information processing apparatus (computer), a printer 1002, as an example of a second information processing apparatus (computer), and a host 1003 are connected to a LAN 2011 and mutually communicable.

Figure 2:
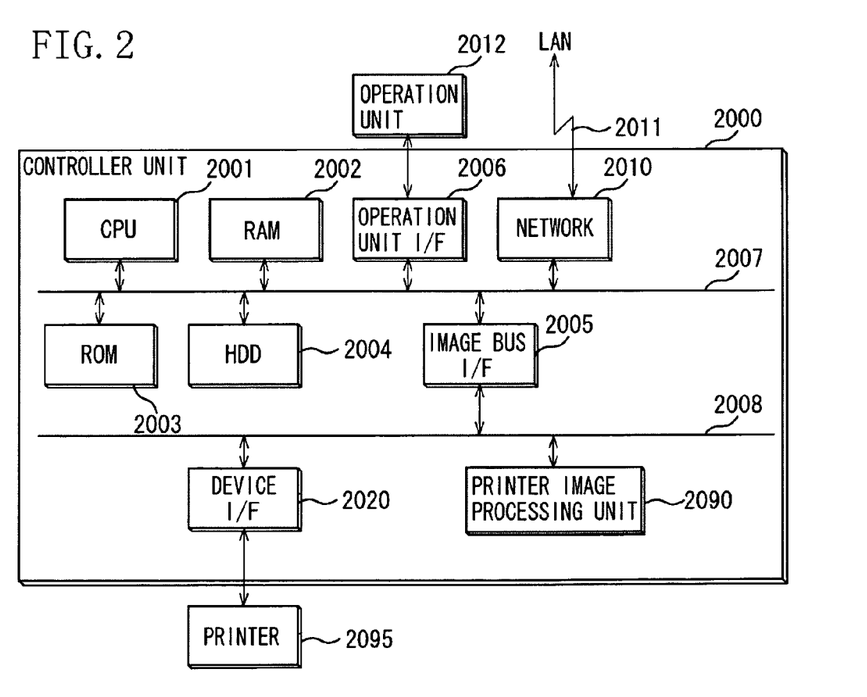
FIG. 2 illustrates an example of a hardware configuration of a printer.

FIG. 2 illustrates an example of a hardware configuration of the printer 1001 and the printer 1002.

A controller unit 2000 is connected to a printer 2095 as an image output device as well as the LAN 2011 and controls input/output of image information and device information. A central processing unit (CPU) 2001 controls the whole system. A random access memory (RAM) 2002 is a system work memory for the CPU 2001 and also an image memory for temporarily storing image data. A read only memory (ROM) 2003 is a boot ROM for storing a boot program of the system. A hard disk drive (HDD) 2004 includes a hard disk drive and an integrated device electronics (IDE) controller. System software, image data, and management information about the software and the image data are stored in the HDD 2004.

An operation unit interface (I/F) 2006 is an interface unit of an operation unit (UI) 2012. The operation unit I/F 2006 outputs the image data to the operation unit 2012, on which the image data is displayed. Further, the operation unit I/F 2006 transmits information input by a user of the information processing system using the operation unit 2012 to the CPU 2001. A network 2010 is connected to the LAN 2011 and used for input/output of information. The above-described devices are arranged on a system bus 2007.

An Image Bus I/F 2005 connects the system bus 2007 and an image bus 2008 which transmits the image data at high-speed, and serves as a bus bridge for converting data structure. The image bus 2008 is a peripheral component interconnect (PCI) bus or a bus based on IEEE 1394. A device I/F 2020 and a printer image processing unit 2090 are connected to the image bus 2008. The device I/F 2020 connects the printer 2095 and the controller unit 2000 and converts the image data synchronously/asynchronously. The printer image processing unit 2090 performs data correction and resolution conversion of the image data to be output from the printer.

Figure 3:
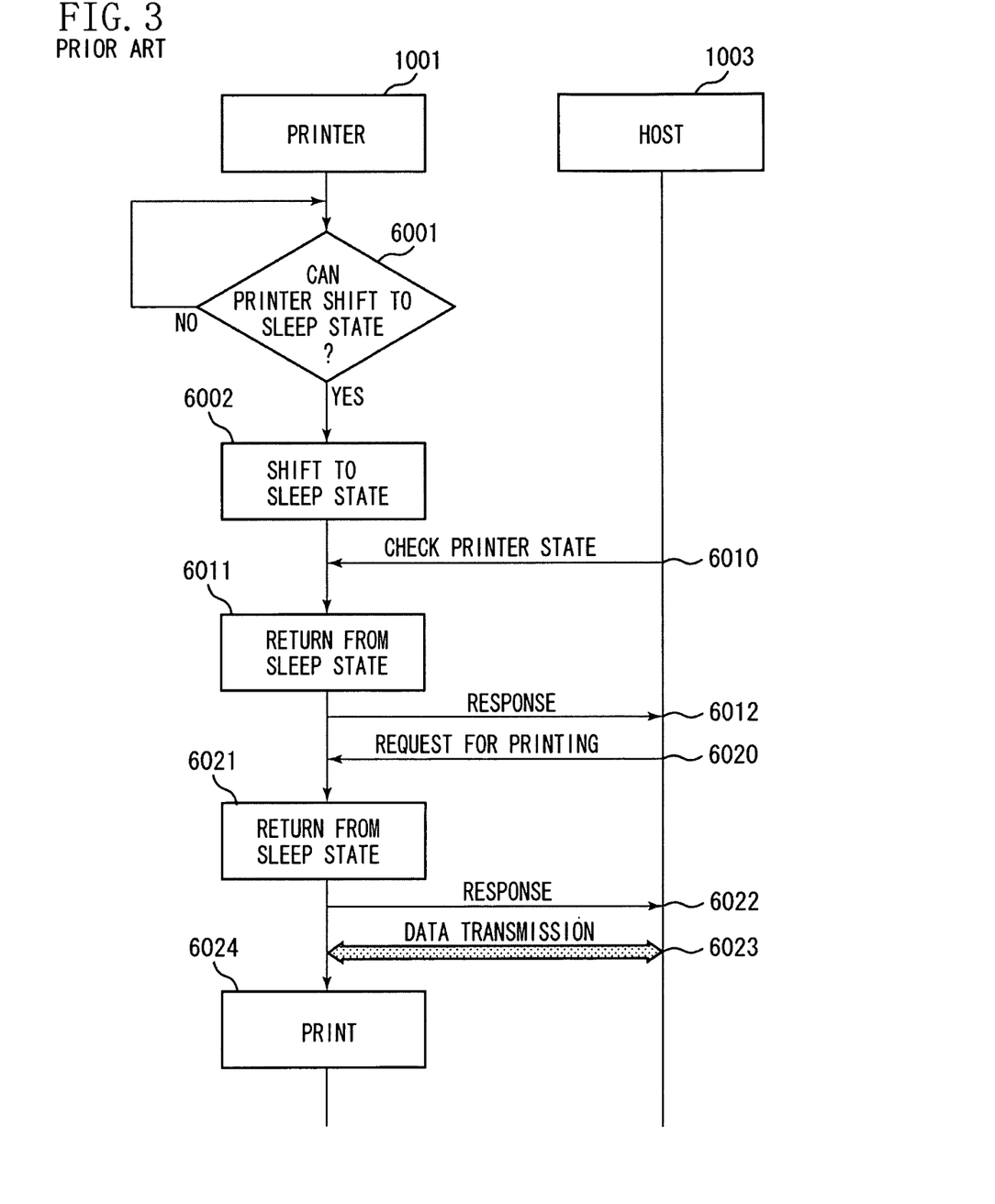
FIG. 3 illustrates operation of a conventional printer when the printer shifts to a sleep state.

FIG. 3 illustrates a conventional operation example of the printer 1001 when the printer shifts to a sleep (power-saving) state.

In step 6001, the printer 1001 determines whether it can shift to the sleep state. If conditions are satisfied (YES in step 6001), then in step 6002, the printer 1001 shifts to the sleep state.

In step 6010, when the host 1003 checks a state of the printer 1001 after the printer 1001 is shifted to the sleep state, the printer 1001 returns from the sleep state to a normal operation state in step 6011. In step 6012, the printer 1001 sends necessary information to the host 1003. After sending the information, the printer 1001 enters into the sleep state according to the processing in steps 6001 and 6002.

In step 6020, when the host 1003 sends a print request to the printer 1001 after the printer 1001 is shifted to the sleep state, then in step 6021, the printer 1001 returns from the sleep state to the normal operation state. In step 6022, the printer 1001 responds to the host 1003. In step 6023, the printer 1001 receives data from the host 1003. In step 6024, the printer 1001 performs printing. After performing printing, the printer 1001 enters into the sleep state according to the processing in steps 6001 and 6002.

According to the above-described conventional example, whether data sent from the host 1003 is data for checking the state or data for requesting printing, the printer 1001 returns from the sleep state to the normal operation state, and enters into the sleep state again when processing is finished. Thus, in an environment, for example, where many hosts are running and inquiries from the hosts to the printer 1001 are frequently made, the printer 1001 repeatedly returns from the sleep state to the normal operation state.

Figure 4:
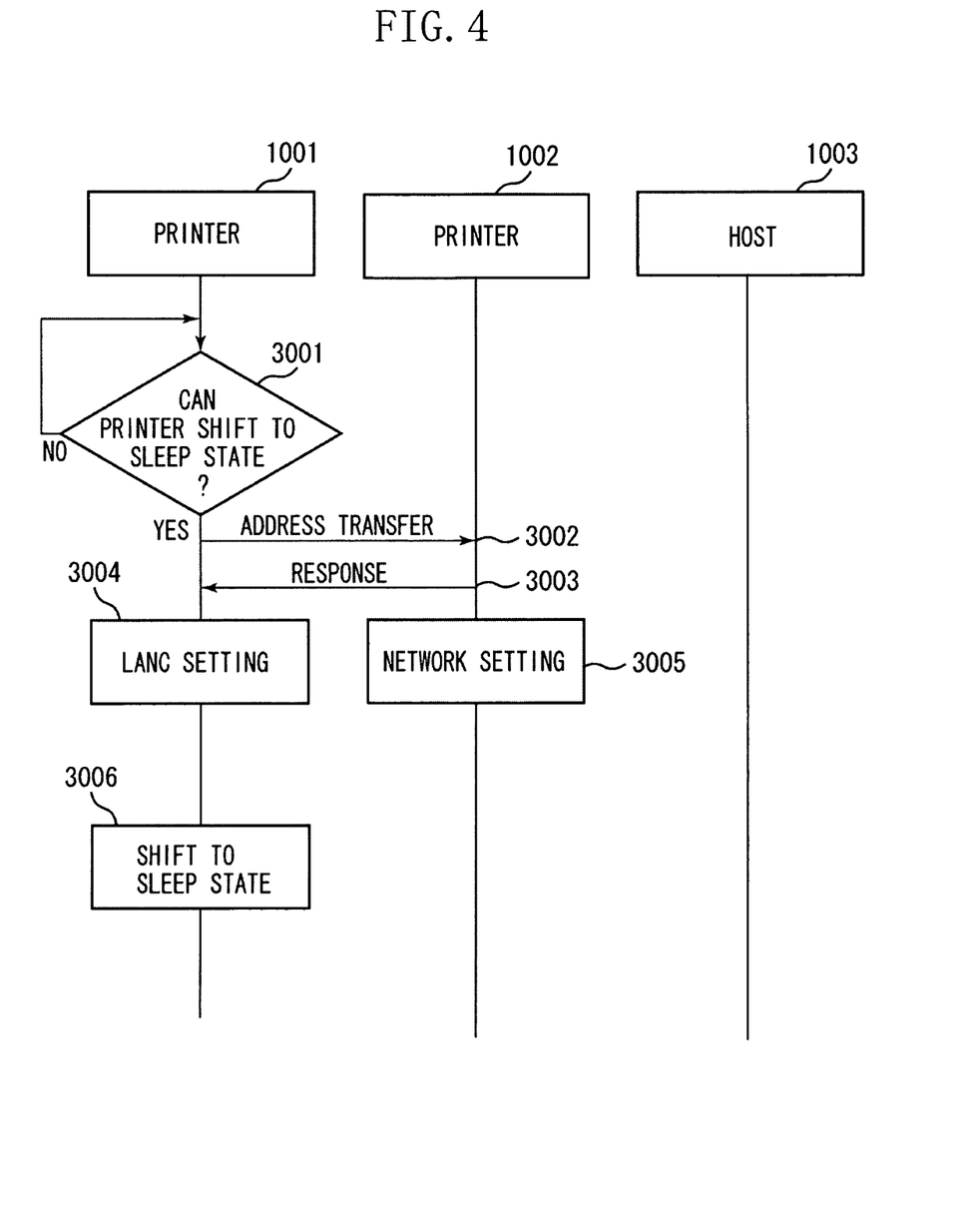
FIG. 4 illustrates an operation example when a printer in the information processing system shifts to a sleep state according to the exemplary embodiment of the present invention.

FIG. 4 illustrates an operation example when the printer 1001 in the information processing system shifts to the sleep state according to the present exemplary embodiment.

In step 3001, the printer 1001 determines whether it can shift to the sleep state (the power saving state). If conditions are satisfied (YES in step 3001), then in step 3002, the printer 1001 retains at least one network address from a plurality of network addresses and transfers other network addresses to the printer 1002 which is specified in advance. The printer 1001 notifies the printer 1002 of the retained network address as a return address of a table described below.

Figure 5A:
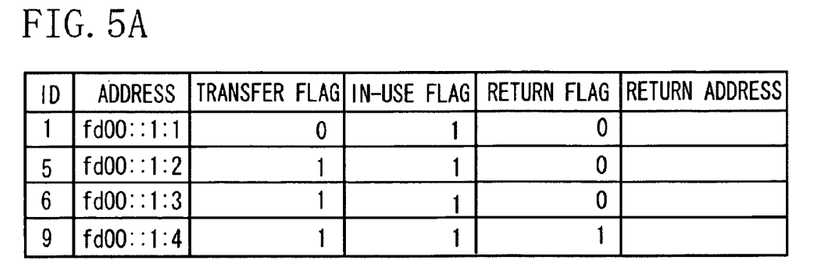
FIGS. 5A and 5B illustrate examples of address tables of a first printer and a second printer.
Figure 5B:
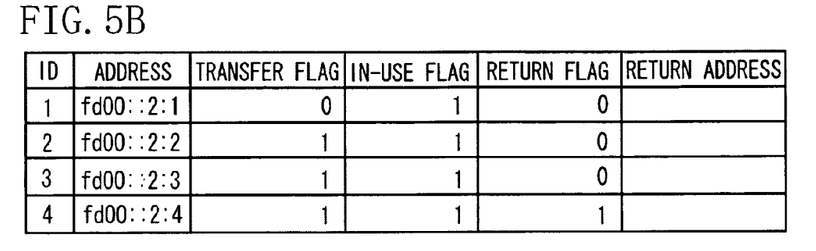

Address tables of the printer 1001 and the printer 1002 before the transfer of the addresses are illustrated in FIGS. 5A and 5B respectively. An identifier (ID) in the table represents a function. In the address tables in FIGS. 5A and 5B, an ID 1 is for return from sleep, IDs 5 and 6 are for various state checking, and an ID 9 is for requesting printing. A transfer flag is set for each network address (hereinafter referred to as an address) of the IDs 5, 6, and 9 since these addresses are transfer targets when the printer 1001 shifts to the sleep state. Since all addresses are used, in-use flags are set to all IDs. Further, a return flag is set for the address of the ID 9. The return flag indicates whether a source of the transferred addresses (the printer 1001) needs to be returned from the sleep state to the normal state when the host 1003 gains access in a state where addresses are transferred.

Figure 6A:
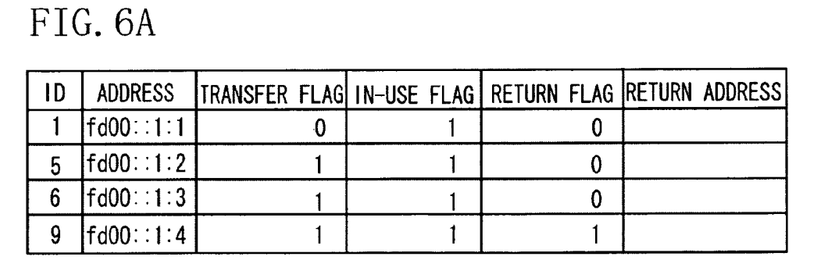
FIGS. 6A and 6B illustrate other examples of the address tables of the first printer and the second printer.
Figure 6B:
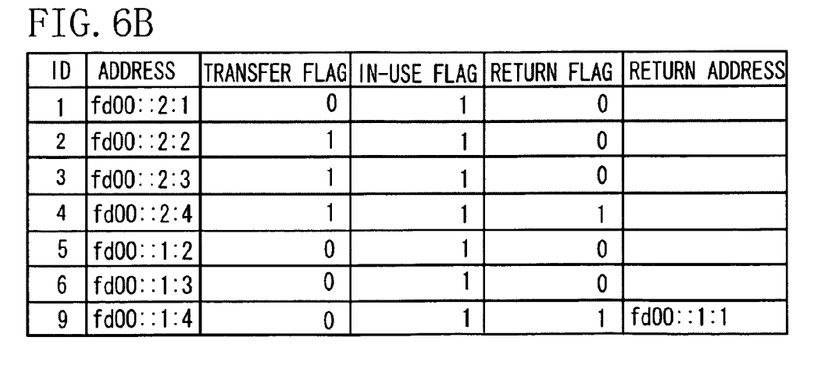

Address tables of the printer 1001 and the printer 1002 after the transfer of the addresses are illustrated in FIGS. 6A and 6B respectively. In the address table of the printer 1001 illustrated in FIG. 6A, the in-use flags of the transferred addresses are reset by the printer 1001. The transferred addresses are added to the table of the printer 1002 illustrated in FIG. 6B and, simultaneously, the transfer flags are reset so that the addresses cannot be transferred to another apparatus by the printer 1002. Further, regarding the address of the ID 9 for which the return flag is set, a return address (ID=1) is recorded by the printer 1002. The return address is used when the printer 1001 returns from the sleep state to the normal state.

The above-described processing regarding address transfer will now be described more concretely referring to FIGS. 5A, 5B, 6A, and 6B. When conditions for shifting to the sleep state are satisfied, the printer 1001 refers to the transfer flag in the table in FIG. 5A, retains the address of the ID 1, and transfers the addresses of the IDs 5, 6, and 9 to the printer 1002. Next, the printer 1001 refers to the return flag in the table in FIG. 5A and determines an address for which the return flag is set. In a case of the table in FIG. 5A, the return flag is set for the address of the ID 9. Thus, the printer 1001 sends the addresses of the IDs 5, 6, and 9 to the printer 1002 as the addresses to be transferred, and also notifies the printer 1002 that the return flag is set for the address of the ID 9 and of the address of the ID 1 which is retained in the printer 1001.

The printer 1001 can transmit items and flag information (i.e., network setting) which are set in the table in FIG. 5A to the printer 1002.

In step 3003, when the printer 1002 accepts (receives) the information from the printer 1001, the printer 1002 returns a response confirming that it received the information, to the printer 1001. When the transfer of the addresses is completed, in step 3004, the printer 1001 performs its network (LANC) setting so that the printer 1001 can return from the sleep state when the address of the ID 1 is accessed. Then, in step 3006, the printer 1001 shifts to the sleep state (the power saving state). In step 3005, the printer 1002 performs its network setting so that it can receive data sent to the addresses of the IDs 5, 6, and 9 that have been transferred to the printer 1002. Accordingly, the setting of the printer 1002 is changed from what is illustrated in the table in FIG. 5B to what is illustrated in the table in FIG. 6B.

Figure 7:
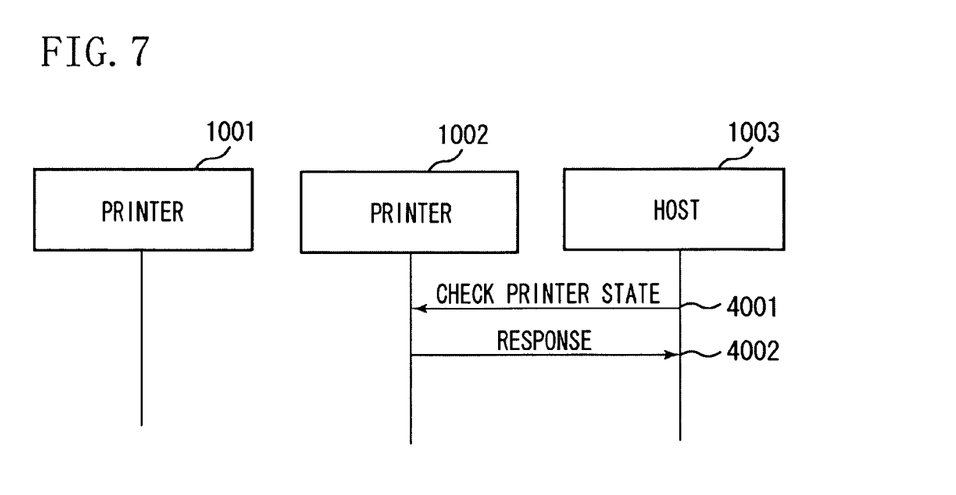
FIG. 7 illustrates operations when the first printer completes transfer of addresses and shifts to a sleep state and a host accesses the second printer which is in a state capable of responding the transferred addresses to check a state of the first printer.

Referring to FIG. 7, the first printer 1001 has completed the transfer of the addresses and shifted to the sleep state, and the printer 1002 can respond to the transferred addresses. FIG. 7 illustrates the operations which are performed when the host 1003 accesses the printer 1002 to check the state of the printer 1001.

In step 4001, when the host 1003 tries to access the addresses of the IDs 5 and 6 to check the state of the printer 1001, since the addresses are transferred to the printer 1002, the host 1003 actually communicates with the printer 1002. In step 4002, the printer 1002 searches the table illustrated in FIG. 6B for the addresses that have been accessed and refers to the return flag in the table. Since the return flag is not set for the addresses of the IDs 5 and 6 in a case of state checking, the printer 1002 responds to the host 1003 in place of the printer 1001 and sends the state of the printer 1001 to the host 1003.

During this period, since the printer 1001 is not accessed, the printer 1001 can stay in the sleep state. Power consumption is therefore reduced.

Figure 8:
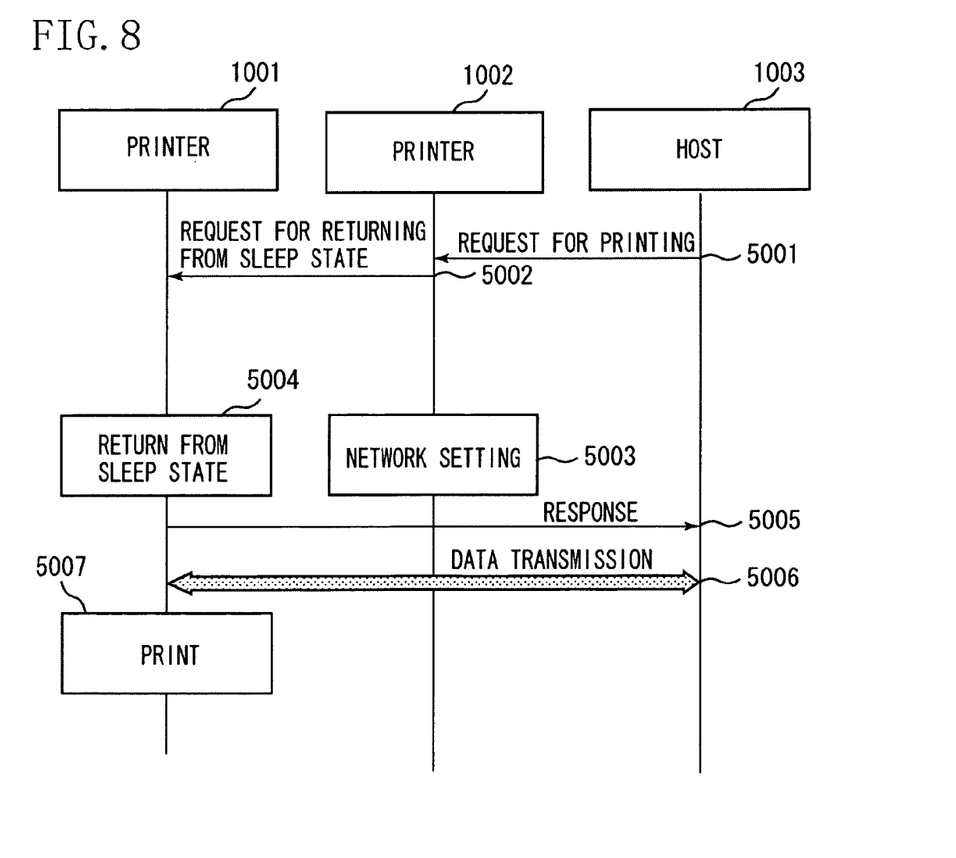
FIG. 8 illustrates operations when the first printer completes transfer of addresses and shifts to the sleep state and the host accesses the second printer which is in the state capable of responding the transferred addresses to send a print request to the first printer.

Referring to FIG. 8, the printers 1001 has completed transfer of addresses and shifted to the sleep state, and the printer 1002 can respond to the transferred addresses. FIG. 8 illustrates operations which are performed when the host 1003 accesses the printer 1002 to send a print request to the printer 1001.

In step 5001, the host 1003 tries to access the address of the ID 9 to send a printing request to the printer 1001. Since the address of the ID 9 is transferred to the printer 1002, the host 1003 actually communicates with the printer 1002. In step 5002, the printer 1002 searches the table illustrated in FIG. 6B for the address that has been accessed and refers to the return flag in the table. Since the return flag is set for the address of the ID 9 in a case of requesting printing, the printer 1002 refers to the return address in the table and accesses the address or sends access data to the address. Information such as the address of the host 1003 which is a source of the print request, and a type of the access (in this case, a print request) are included in the access data. When the access is completed, in step 5003, the printer 1002 resets the network so as not to receive the access to the addresses of the IDs 5, 6, and 9 which have been transferred to the printer 1002.

In step 5004, the printer 1001 which has been accessed using a sleep return address performs a sleep return operation and returns to the normal state of operation. In step 5005, the printer 1001 responds to the host 1003 based on the information sent via the printer 1002. Then, in step 5006, as is the case with the normal print operation, the printer 1001 receives print data from the host 1003 and performs printing in step 5007.

The present exemplary embodiment is described with an example where addresses for two IDs 5 and 6 are set for the purpose of the state checking. Normally, the network setting is necessary to enable the state checking while the printer is in the sleep state. Since a number of the networks that can be set is limited, it is necessary to select commands that need response. On the other hand, since a number of the state checking addresses is not limited, the present exemplary embodiment can be adapted for increasing command types for state checking which is expected to occur in the future.

As described above, according to the present exemplary embodiment, when a printer, which is an example of an information processing apparatus, shifts to a power saving state, the printer transfers an IP address to another information processing apparatus (printer) which is registered in advance, and shifts to the power saving state. In this way, the information processing apparatus will not accept access of network communication such as inquiry of state checking which can be carried out by the other information processing apparatus. Accordingly, the information processing apparatus can maintain the power saving state longer and reduce power consumption. Further, even if the types of inquiry increase, power saving can be realized without being limited by performance of LANC.

A system according to the above-described exemplary embodiment can respond to an inquiry of state checking or the like while maintaining power saving state of an information processing apparatus.

The present invention can be achieved by an exemplary embodiment described below. First, a storage medium (or a recording medium) storing a software program code which realizes functions of the above-described exemplary embodiment is supplied to a system or an apparatus. Then, a central processing unit (CPU) or a micro processing unit (MPU) of the system or the apparatus reads and executes the program code stored in the storage medium. In this case, the program code read out from the storage medium realizes the functions described in the above-described exemplary embodiment. Thus, the storage medium which stores the program code constitutes the present invention.

Further, an operating system (OS) or the like which runs on the system or the apparatus can execute a part or whole of the actual processing based on an instruction of the program code read out by the central processing unit of the system or the apparatus. A case where the functions of the above-described exemplary embodiment are realized according to the processing is also included in the present invention.

Furthermore, the program read out from the storage medium can be written into a memory of a function expansion card which is inserted into the system of the apparatus or into a memory of a function expansion unit which is connected to the system or the apparatus. Based on an instruction of the program, the CPU provided on the function expansion card or the function expansion unit can execute part or all of the actual processing so that the functions of the above-described exemplary embodiment can be realized. A case where the functions of the above-described exemplary embodiment are realized according to the processing is also included in the present invention.

When the present invention is adapted to the storage medium, the storage medium will include the program code that corresponds to the flowchart described above.

While the present invention has been described with reference to exemplary embodiments, it is to be understood that the invention is not limited to the disclosed exemplary embodiments. The scope of the following claims is to be accorded the broadest interpretation so as to encompass all equivalent structures, and functions.

This application claims priority from Japanese Patent Application No. 2008-037849 filed Feb. 19, 2008, which is hereby incorporated by reference herein in its entirety.

What is claimed is:

1. An information processing apparatus for comprising:
an accepting unit configured to accept network addresses having been transferred from another information processing apparatus, thereby the network addresses are allocated for the information processing apparatus and not for the other information processing apparatus; and a responding unit configured to make a response corresponding to an access request from a host device, if a network address which is not related to a return of the other information processing apparatus from a power saving state to a normal state is accessed from among the network addresses having been transferred by the accepting unit, wherein the accepting unit is operable to accept the network addresses having been transferred from the other information processing apparatus and information about a network address retained in the other information processing apparatus, and wherein the information processing apparatus further comprises an access unit configured to access, via the network, the network address retained in the other information processing apparatus based on the information about a network address retained in the other information processing apparatus if the network address which is related to the return of the other information processing apparatus from the power saving state to the normal state is accessed from among the network addresses accepted by the accepting unit by the host device.

2. The information processing apparatus according to claim 1, wherein the accepting unit accepts the network addresses having been transferred from the other information processing apparatus and information about a network address retained in the other information processing apparatus; and wherein the information processing apparatus further comprises an access unit configured to access the network address retained in the other information processing apparatus based on the information about the network address retained in the other information processing apparatus when the network address which is related to the return of the other information processing apparatus from the power saving state to the normal state is accessed from among the network addresses accepted by the accepting unit.

3. The information processing apparatus according to claim 2, further comprising a setting unit configured to set the network addresses accepted by the accepting unit so that the network addresses cannot be used when the access unit accesses the network address retained in the other information processing apparatus.

4. An information processing system comprising a first information processing apparatus for which a plurality of addresses can be allocated and a second information processing apparatus, wherein the first information processing apparatus comprises:

a transfer unit configured to retain at least one network address from among a plurality of network addresses which are allocated for the information processing apparatus and transfer other network addresses to the second information processing apparatus thereby the other network addresses are allocated not for the first information processing apparatus but for the second information processing apparatus;

a power saving state shifting unit configured to shift to a power saving state; and a return unit configured to return the power saving state to a normal state when the retained network address is accessed; and wherein the second information processing apparatus comprises:

an accepting unit configured to accept the other network addresses having been transferred from the first information processing apparatus; and a responding unit configured to make a response corresponding to an access request from a host device, if a network address which is not related to a return of the first information processing apparatus from the power saving state to the normal state, is accessed from among the network addresses having been transferred by the accepting unit, wherein the accepting unit is operable to accept the network addresses having been transferred from the first information processing apparatus and information about a network address retained in the first information processing apparatus, and wherein the second information processing apparatus further comprises an access unit configured to access, via the network, the network address retained in the first information processing apparatus based on the information about a network address retained in the first information processing apparatus if the network address which is related to the return of the first information processing apparatus from the power saving state to the normal state is accessed from among the network addresses accepted by the accepting unit by the host device.

5. The information processing system according to claim 4, wherein the accepting unit accepts the network addresses having been transferred from the first information processing apparatus and information about the network address retained the first information processing apparatus; and wherein the second information processing apparatus further comprises an access unit configured to access the network address retained in the first information processing apparatus based on the information about the network address retained in the first information processing apparatus when the network address which is related to the return of the first information processing apparatus from the power saving state to the normal state is accessed out of the network addresses accepted by the accepting unit.

6. A method for controlling an information processing apparatus comprising:

accepting network addresses having been transferred from another information processing apparatus thereby the network addresses are allocated for the information processing apparatus and not for the other information processing apparatus;

making a response corresponding to an access request from a host device, when a network address which is not related to a return of the other information processing apparatus from a power saving state to a normal state is accessed from among the accepted network addresses having been transferred;

accepting information about a network address retained in the other information processing apparatus; and accessing, via the network, the network address retained in the other information processing apparatus based on the information about a network address retained in the other information processing apparatus if the network address which is related to the return of the other information processing apparatus from the power saving state to the normal state is accessed from among the accepted network addresses by the host device.

7. A method for controlling an information processing system comprising a first information processing apparatus for which a plurality of addresses can be allocated and a second information processing apparatus, the method comprising:

retaining at least one network address from among a plurality of network addresses which are allocated for the information processing apparatus and transferring other network addresses from the first information processing apparatus to the second information processing apparatus thereby the other network addresses are allocated not for the first information processing apparatus but for the second information processing apparatus;

shifting the first information processing apparatus to a power saving state; and returning the first information processing apparatus from the power saving state to a normal state when the retained network address is accessed;

causing the second information processing apparatus to accept the other network addresses sent from the first information processing apparatus as network addresses having been transferred from the first information processing apparatus; and causing the second information processing apparatus to make a response corresponding to an access request from a host device, when a network address which is not related to a return of the first information processing apparatus from the power saving state to the normal state, is accessed from among the accepted network addresses having been transferred, accepting information about a network address retained in the first information processing apparatus; and accessing, via the network, the network address retained in the first information processing apparatus based on the information about a network address retained in the first information processing apparatus if the network address which is related to the return of the first information processing apparatus from the power saving state to the normal state is accessed from among the accepted network addresses by the host device.

8. A program for causing a computer to function as an accepting unit configured to accept network addresses for an information processing apparatus having been transferred from another information processing apparatus for which a plurality of addresses can be allocated, thereby the network addresses are allocated for the information processing apparatus and not for the other information processing apparatus, and a responding unit configured to make a response corresponding to an access request from a host device, when a network address which is not related to a return of the other information processing apparatus from a power saving state to a normal state, is accessed from among the network addresses having been transferred by the accepting unit, wherein the accepting unit is operable to accept the network addresses having been transferred from the other information processing apparatus and information about a network address retained in the other information processing apparatus, and wherein the information processing apparatus further comprises an access unit configured to access, via the network, the network address retained in the other information processing apparatus based on the information about a network address retained in the other information processing apparatus if the network address which is related to the return of the other information processing apparatus from the power saving state to the normal state is accessed from among the network addresses accepted by the accepting unit by the host device.

9. A computer-readable storage medium configured to store the program according to claim 8.

* * * * *